(12) United States Patent
Gerraty et al.

(10) Patent No.: US 8,161,012 B1
(45) Date of Patent: Apr. 17, 2012

(54) FILE INTEGRITY VERIFICATION USING A VERIFIED, IMAGE-BASED FILE SYSTEM

(75) Inventors: Simon J. Gerraty, Sunnyvale, CA (US); Stephen Kiernan, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 255 days.

(21) Appl. No.: 12/701,334

(22) Filed: Feb. 5, 2010

(51) Int. Cl.
*G06F 17/30* (2006.01)
*G06F 9/455* (2006.01)

(52) U.S. Cl. ............................................. 707/687; 718/1
(58) Field of Classification Search .................. 707/687, 707/802; 718/1
See application file for complete search history.

(56) References Cited

U.S. PATENT DOCUMENTS

| 5,721,948 | A  | * | 2/1998  | Duncan ............................. | 710/5 |
| 6,353,887 | B1 |   | 3/2002  | Cotugno et al. | |
| 6,463,535 | B1 |   | 10/2002 | Drews | |
| 6,567,826 | B1 | * | 5/2003  | Fischer et al. ......................... | 1/1 |
| 7,305,393 | B2 |   | 12/2007 | Seeger et al. | |
| 7,356,679 | B1 | * | 4/2008  | Le et al. ............................. | 713/1 |
| 2006/0005003 | A1 | * | 1/2006 | Grobman ........................... | 713/2 |
| 2009/0089860 | A1 | * | 4/2009 | Forrester et al. .................. | 726/3 |

* cited by examiner

*Primary Examiner* — James Trujillo
*Assistant Examiner* — Jorge A Casanova
(74) *Attorney, Agent, or Firm* — Shumaker & Sieffert, P.A.

(57) ABSTRACT

In general, the invention is directed to techniques for verifying the integrity of a file system and individually verifying files contained therein based on the integrity of the file system. For example, a computer-based device is described in which a computer-readable storage medium stores a file system stored as an image file. The device comprises a virtual file system comprising a mount list entry that corresponds to the file system, wherein the file system is mounted on the virtual file system, and wherein the mount list entry comprises a first verified flag that indicates whether the file system is verified. A verified execution module determines whether the image file is corrupt, and a kernel module sets the first verified flag when the image file is not corrupt. An image verify module verifies the integrity of files stored by the file system by determining whether the file system is verified.

19 Claims, 6 Drawing Sheets

FILE INTEGRITY VERIFICATION USING A VERIFIED, IMAGE-BASED FILE SYSTEM

TECHNICAL FIELD

The invention relates to computer-based devices and, more particularly, to verifying the integrity of files stored by computer-based devices.

BACKGROUND

A computer-based device executes files that are stored on local or remote storage devices and contain program code that directs operations for the computer-based device. Such executable files include, for example, binary executables, shared program code libraries, link libraries, and program files interpreted by an interpreter for execution. An executable file stored on a storage device can become corrupted as a result of malicious action in the form of trojans, viruses, or other malware that infiltrate the storage device and modify the file. Errors in storage and transport operations on the executable file data, as well as defects in the storage medium, for instance, can also cause corruption.

When executed by a computer-based device, corrupted executable files cause undesirable operation, including indeterminate device behavior, program faults, corruption of other files and system crashes. In addition, malware-based corruption can subvert an executing computer-based device to compromise system and enterprise security.

SUMMARY

In general, the invention is directed to techniques for verifying the integrity of executable files within a computer-based device. More specifically, techniques are described for verifying the integrity of a file system and individually verifying files contained therein based on the integrity of the file system in order to prevent the execution of unauthorized binaries.

In one example, a network device uses file systems to store and organize files on a storage medium. File systems include files and metadata (e.g., directories, directory records, and attributes) that enable a user of the file system to efficiently locate and access the files on the storage medium. In some instances, a file system may itself be stored as a single file that may be referenced, read, and manipulated within the context of another file system. For example, files stored on compact flash may be arranged according to the International Organization for Standardization (ISO) 9660 file system format. Files arranged according to the ISO 9660 format can be archived as a single "ISO image" file that contains the file system, including the uncompressed files and metadata, which can include hundreds or even thousands of executable files.

When the network device kernel mounts the file system contained in the ISO image, the kernel also establishes the integrity of the ISO image file itself using a digital signature calculated for the ISO image file according to a hashing algorithm. Because alterations of any of the component files of an ISO image would also compromise the integrity of ISO image file itself, verifying the ISO image using the associated digital signature ensures, at a high probability, that the component files have not been modified. If the calculated signature matches a certified, pre-calculated signature, the network device locates, in a file system data structure, the file system mounted from the ISO image and marks that file system as verified.

The network device kernel handles requests to execute program code in a file by tracing a reference structure for the file to the containing file system and determining whether the file system is marked as verified. If so, the kernel may rely on the prior verification of the file system that contains the executable file to avoid individually verifying the file.

In another embodiment, the invention is directed to a device comprising a processor and a computer-readable storage medium that stores a file system as an image file, wherein the image file is stored on the medium as a single file that comprises a plurality of files and metadata for the file system. The device further comprises a virtual file system comprising a mount list entry that corresponds to the file system, wherein the file system is mounted on the virtual file system, and wherein the mount list entry comprises a first verified flag that indicates whether the file system has been verified. The device additionally comprises a verified execution module executing on the processor to determine whether the image file is corrupt when the file system is mounted and a kernel module executing on the processor to set the first verified flag when the verified execution module determines that the image file is not corrupt. The device further comprises an image verify module executing on the processor to verify a file in the plurality of files when an access request is received for the file, wherein the image verify module bypasses individual verification of the file by individually verifying the file only when the first verified flag is not set.

In one embodiment, the invention is directed to a method comprising the steps of reading an image file from a computer-readable storage medium of a network device that stores a file system as the image file, wherein the image file is stored on the medium as a single file that comprises files and metadata for the file system. The method additionally comprises mounting the file system to a virtual file system, wherein the virtual file system comprises a mount list entry that corresponds to the file system, and wherein the mount list entry comprises a first verified flag that indicates whether the file system is verified. The method further comprises determining whether the image file is corrupt when the file system is mounted and, after determining whether the image file is corrupt, setting the first verified flag when the image file is not corrupt. The method further comprises receiving an access request for a file in the file system of the image file, and, after determining whether the image file is corrupt, bypassing individual verification of the file by individually verifying the file only when the first verified flag is not set.

In another embodiment, the invention is directed to a computer-readable medium containing instructions. The instructions cause a programmable processor to read an image file from a computer-readable storage medium of network device that stores a file system as an image file, wherein the image file is stored on the medium as single file that comprises files and metadata for the file system. The instructions further cause the programmable processor to mount, with a kernel module, the file system to a virtual file system, wherein the virtual file system comprises a mount list entry that corresponds to the file system, and wherein the mount list entry comprises a first verified flag that indicates whether the file system is verified. The instructions further cause the programmable processor to determine, with a verified execution module, whether the image file is corrupt when the file system is mount and, after determining whether the image file is corrupt, set, with the kernel module, the first verified flag when the image file is not corrupt. The instructions further cause the programmable processor to, after determining whether the image file is corrupt, bypass individual verification of the file by individually verifying the file only when the first verified flag is not set.

The techniques described may provide one or more advantages. For example, verifying an archive file of an entire file system containing a number of files when the archive file is mounted by a network device may relieve the network device of subsequently having to individually verify the component files of file system when the components files are requested for loading and execution. Because cryptographic functions relating to integrity verification are computationally intensive, the techniques may reduce the time and amount of resources required to verify an individual file for execution or other use. For example, during a boot process, a network device may need to verify the integrity of many hundreds of files contained by a file system archive. With conventional verification techniques, the many system calls required to perform file reads for these various files may incur significant costs relating to context-switching between user-space to kernel-space, and between kernel sub-systems. Verifying the archive file when mounted according to the techniques herein may avoid many of these system calls and context switches. Reducing verification time for each of the files may thus accrue a substantial reduction in boot time, particularly in low-end devices.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
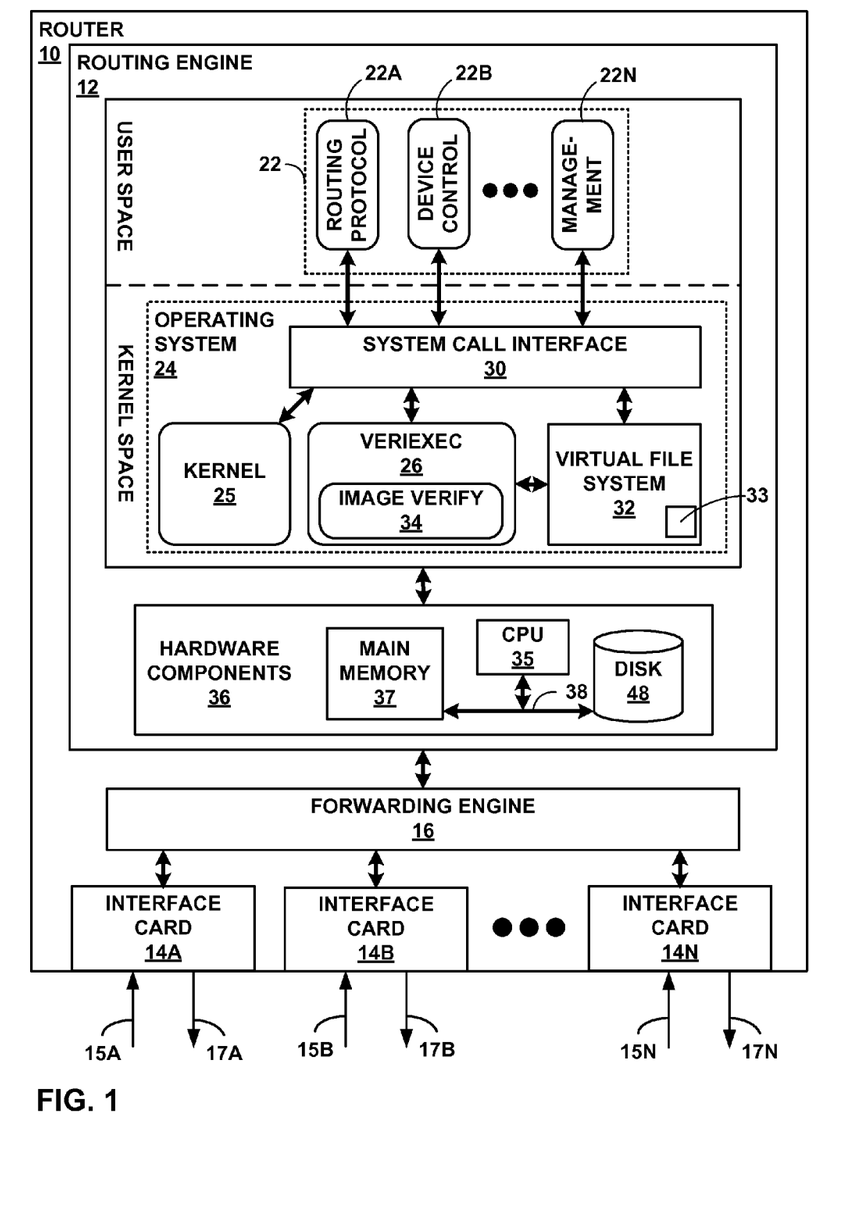
FIG. 1 is a block diagram illustrating a network device that implements verified file system techniques in accordance with the disclosure herein.

FIG. 1 is a block diagram illustrating an exemplary router 10 that performs verified file system techniques to verify the integrity of individual files in accordance with the principles of the invention. Although described with respect to a router, the techniques are applicable to other network and general-purpose computing devices, such as switches, intrusion detection and/or prevention systems, desktop/laptop computers, hand-held devices, and gaming consoles.

In the illustrated embodiment, router 10 includes a plurality of physical interface cards 14A-14N (collectively, IFCs 14), a forwarding engine 16 and a routing engine 12. Routing engine 12 generates forwarding information for forwarding engine 16 in accordance with routing information received from other network devices with which router 10 communicates. Forwarding engine 16 forwards incoming packets received via inbound links 15A-15N to an appropriate next hop, determined from the forwarding information, via outbound links 17A-17N. In some embodiments, the functionality of forwarding engine 16 is distributed to a plurality of packet forwarding engines.

Forwarding engine 16 and routing engine 12 may be implemented in any combination of software, hardware, or firmware. For example, forwarding engine 16 and routing engine 12 may comprise one or more processors that execute software instructions to perform the functions described herein. In that case, the software instructions may be stored on a computer-readable medium, such as computer memory or a hard disk.

In this example, routing engine 12 includes hardware components 36 that comprise central processing unit 35 ("CPU 35"), main memory 37, and disk 48 interconnected via system bus 38. CPU 35 executes program instructions loaded into main memory 37 from disk 48 in order to operate routing engine 12. CPU 35 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure suitable for implementation of the techniques described herein. Disk 48 comprises computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by routing engine 12. In some embodiments, disk 48 comprises a removable mass storage device that stores data and instructions in a Compact-Flash (CF) memory card format.

Main memory 37 comprises one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by a computer. Main memory 37 provides a physical address space composed of addressable memory locations. Routing engine 12 partitions the physical address space of main memory 37 into user space, allocated for running user processes, and kernel space, which is protected and generally inaccessible by user processes.

Routing engine 12 further includes operating system 24, executing in kernel space, that provides an operating environment for multiple daemons 22A-22N ("daemons 22"), which run as processes in the user space of main memory 37. One example of operating system 24 is the JUNOS™ operating systems provided by Juniper Networks, Inc. of Sunnyvale, Calif. Another example of operating system 24 is Berkeley Software Distribution, or BSD, which is available in free and commercial variants. Daemons 22 include routing protocol daemon 22A, device control daemon 22B, and management daemon 22N. Various embodiments of routing engine 12 may include more, fewer, or different daemons.

Operating system 24 comprises kernel 25, system call interface 30, and virtual file system 32. Kernel 25 provides core routines relating to, for example, process management, memory management, and device input/output (I/O) management. In addition, kernel 25 establishes and manages virtual file system 32 to provide uniform access mechanisms to kernel 25 and daemons 22 to file systems mounted for use by routing engine 12.

Virtual file system 32 includes data structures that describe the configurations of one or more file systems in use by routing engine 12. Virtual file system 32 may manage a variety of different types of file systems, including, for example, a Unix file system (UFS), a network file system (NFS), or an ISO 9660 file system. The data and metadata for the file systems managed by virtual file system 32 may be stored on various storage devices, including other network devices (in the case of NFS) or disk 48. Virtual file system 32 specifies a kernel-level interface that a file system implements to provide uniform methods for accessing and manipulating files and directories in file systems mounted to virtual file system 32. The kernel-level interface implements methods to allow requesting kernel 25 to, for example, open or close a file, read/write data from/to a file, change the attributes of a file, and other methods. Another set of operations allow kernel 25 to manage file systems. These operations include, for example, mount and unmount commands. Further details on the ISO 9660 file system format can be found in "Volume and File Structure of CDROM for Information Interchange, $2^{nd}$ ed.," Standard ECMA-119, Ecma International, December 1987, hereby incorporated by reference in its entirety.

In addition, verified file system 32 comprises verified flags 33 that contain one or more binary values that map to component file systems and allow the file systems to be marked as verified according to the techniques described below.

System call interface 30 provides methods that enable daemons 22 to direct the operation of kernel 25, for example, with regard to virtual file system 32. Exemplary system call interface 30 provides pass-through methods for calling kernel-level interface methods implemented by file systems, as well as other methods relating to managing file systems. Routines executing as aspects of kernel 25 may call other routines of kernel 25.

Disk 48 is a storage medium that comprises the physical representation of one or more file systems for routing engine 12. That is, disk 48 includes the files and metadata (e.g., directories, directory records, and attributes) that enable kernel 25 to efficiently locate and access the files within disk 48. Disk 48 includes file systems stored according an archival, or "image," format, such as the International Organization for Standardization (ISO) 9660 file system format. File systems arranged according to the ISO 9660 file system format, for example, can be archived as a single "ISO image" file that contains the file system, including the uncompressed files and metadata. Accordingly, disk 48 includes one or more images that contain one or more of the file systems used by routing engine 12 to operate router 10. Various ones of the file system images may represent various core functions of router 10. For example, disk 48 may include one image that includes files related to routing, another image relating to packet forwarding engine operation, another image relating to router management, and the like. Such modularity improves update reliability and eases development as a result of high functional independence between the images (or "packages"). Virtual file system 32 includes a device driver to support the mounting and operation of an image stored by disk 48 as a file system for routing engine 12.

Figure 2:
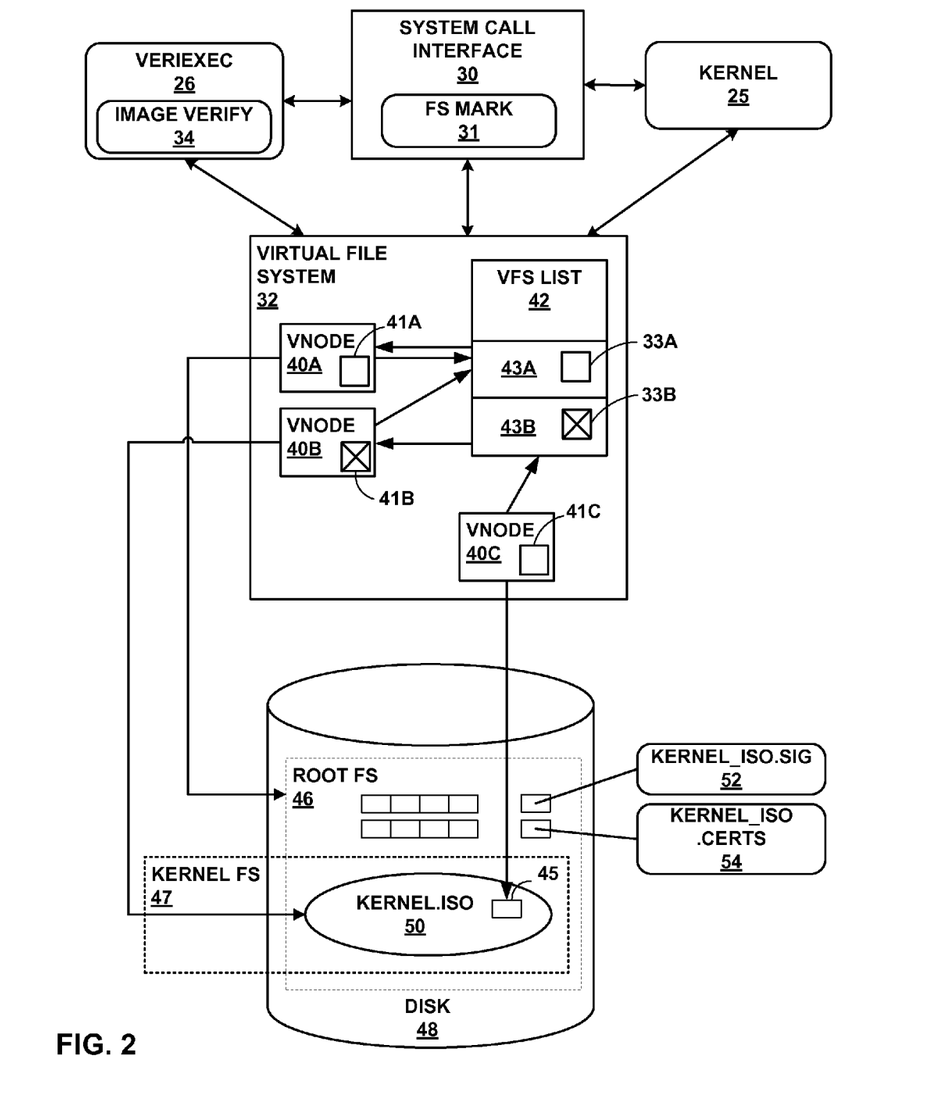
FIG. 2 is a block diagram illustrating, in detail, components of a network device that cooperate to perform techniques of this disclosure.

In accordance with the techniques of this disclosure, and as described in detail with respect to FIG. 2, disk 48 additionally stores digital fingerprints for individually executable files (i.e., files accessible from a file system) and a digital fingerprint for the file system image calculated a priori using a trusted copy of the individual files and the file system image, respectively. In some embodiments, the digital fingerprints are encrypted using the private key of a certificate and stored as a digital signature.

Operating system 24 further comprises verified execution module 26 ("veriexec 26"), which kernel 25 uses to verify the file integrity of files managed by virtual file system 32. In operation, kernel 25 or one of daemons 22 sends veriexec 26 a manifest file comprising manifest entries that map a file path in a file system to a digital fingerprint for the file that has been calculated a priori with a hashing algorithm. Examples of well-known hashing algorithms include, for example, MD5, SHA1, SHA256, RMD160, and others. When a file that has an entry in the manifest is read or executed, veriexec 26 calculates, using the same hashing algorithm with which the pre-calculated fingerprint was generated, a digital fingerprint for the file and compares the calculated fingerprint with the fingerprint in the manifest entry. Different fingerprints indicate that the file has been corrupted. Veriexec 26 may respond to a corrupted file by warning the kernel or a user; by preventing the file from executing or being read; or, in some cases, by locking down router 10 to prevent corrupted operation of the router.

Because calculating a digital fingerprint for a file is both I/O and computationally intensive, veriexec 26 caches the result of the verification process. Veriexec 26 runs continually to monitor files that have entries in the manifest. In some embodiments, veriexec 26 operates as a kernel 25 sub-system. In some embodiments, veriexec 26 executes as a sub-routine of a file exec, file read, or some other routine performed by kernel 25, rather than continually. In such embodiments, kernel 25 caches the information specifying whether a file has been previously verified.

Veriexec 26 is capable of verifying the integrity of individual files when requested for loading and execution. In addition, in accordance with the techniques of this disclosure, veriexec 26 is capable of verifying the integrity of an individual file system image when the file system image is used by operating system 24 to mount an instance of a file system. When kernel 25, using the kernel-level interface provided by virtual file system 32, mounts an instance of a file system backed by an image file on disk 48, kernel 25 additionally directs veriexec 26 to verify the integrity of the entire image file itself. In response, veriexec 26 calculates a digital fingerprint of the image file and compares the calculated fingerprint to the pre-calculated fingerprint for the file that is stored by disk 48. If the fingerprints do not match, then the image file (and thus the file system) is corrupt and veriexec 26 informs kernel 25 of the corruption. Kernel 25 may then perform remedial measures, which may in some instances include unmounting the file system, alerting an administrator, or other measures.

If, however, the fingerprints match, then the integrity of the image file is verified. Because any modifications of the file system contained by the image file (a modification to a binary executable in the file system, for instance) would modify the image file, a verified image file similarly indicates a verified file system backed by the image file. Veriexec 26 returns a success value or otherwise indicates to kernel 25 that the image file is verified.

Upon determining, with veriexec 26, that the image file is verified, kernel 25 proceeds to mark the mounted file system associated with the image file. Specifically, kernel 25 sets the one of verified flags 33 that maps to or is otherwise associated with the verified file system. In some embodiments, veriexec 26 performs a system call exposed by system call interface 30 to direct kernel 25 to perform the marking techniques described above.

During operation of router 10, kernel 25 and daemons 22 execute, read, and otherwise use files stored by disk 48 that require verification to ensure the proper operation of the device.

Veriexec 26 comprises image verify 34 to perform, according to the techniques herein described, file integrity checks based on whether a file system backed by an image has been verified. During a file integrity verification process, veriexec 26 provides a file structure associated with a stored file (e.g., a file descriptor, a file path, or a vnode), to image verify 34. Image verify 34 uses the provided information to determine whether the file is contained by a verified file system. That is, image verify 34 queries virtual file system 32 to first ascertain the file system that contains the file. Then image verify 34 determines whether the one of verifies flags 33 that maps to the file system that contains the file is set. If so, then the file system is a verified file system. Because a verified file system indicates that the files contained therein are not corrupt, image verify 34 is able to thus verify the integrity of the file for veriexec 26 while bypassing individual verification of the file and the concomitant calculation of a digital fingerprint for the file. If the file system is not marked as verified, however, image verify 34 directs veriexec 26 to verify the individual file being requested for execution.

Performing file verification techniques in this manner may allow operating system 24 to avoid calculating digital fingerprints for constituent files that are contained by a verified file system. Because, in some instances, operating system 24 may be required to calculate such fingerprints for hundreds or even thousands of files during a device boot, operating system 24 may realize substantial time and resource savings and thereby reduce the boot time. Furthermore, in some embodiments, the techniques do not in any way compromise the file integrity assurance conventionally provided by a verified exec file integrity subsystem, for the cryptographic strength of the fingerprint calculation for an image file that contains a file is similar to the strength of a similar calculation performed on the file itself.

FIG. 2 is a block diagram illustrating exemplary components of example router 10 in further detail. Disk 48 comprises root file system 46 (illustrated as "Root FS 46") for routing engine 12. Root file system 46 comprises files and metadata for booting routing engine 12 and is the file system upon which all other file systems are mounted. Root file system 46, in some embodiments, is a Unix file system.

Root file system 46 includes the three illustrated files, KERNEL.iso 50, KERNEL_ISO.sig 52, and KERNEL_ISO.certs 54. KERNEL.iso 50 is an image file that contains files and file system metadata used to specify the operation of packet forwarding engines, e.g., forwarding engine 16, of router 10. In the example of FIG. 2, KERNEL.iso 50 is an ISO image file formatting according to the ISO 9660 file system format. In some instances, the image file (in this case, KERNEL.iso) is contained in another file system mounted on root file system 46. KERNEL_ISO.sig 52 is a file comprising a digital signature of KERNEL.iso 50. A digital signature for a file consisted of a digest, or fingerprint, of the file computed using a hashing algorithm, e.g., SHA1, that is then encrypted (or "signed") using a cryptographic key. KERNEL_ISO.certs 54 includes one or more digital certificates of a certificate chain that each include an identity of the certificate owner and a public key. Each of the certificates in the certificate chain is signed by the subsequent certificate. Confirming a match between a signature in a certificate and a signature of the certificate computed with the public key of the subsequent certificate in the chain establishes a link in the chain of trust. In this example, the digital signature of KERNEL_ISO.sig 52 is generated using the public key of one of the certificates in the certificate chain.

Virtual file system 32 comprises virtual file system list 42 (illustrated as "VFS list 42"). Virtual file system list 42 is a linked list that includes mount list entries 43A-43B ("mount list entries 43") that each contain data about a corresponding mounted file system. In some instances, the data comprises or references a superblock for the corresponding mounted file system. The kernel uses the data in mount list entries 43 to determine, for example, the name of the device that an associated file system uses, the name of the file system, and the location, in the routing engine 12 directory hierarchy, of the file system relative to the root. In some embodiments, virtual file system list 42 is a table, tree, or other data structure. Root file system 46, as the root file system and thus first in virtual file system list 42, is associated with mount list entry 43A. The file system stored by KERNEL.iso 50, KERNEL file system 47, is mounted on root file system 46 and is associated with mount list entry 43B.

Virtual file system 32 further comprises vnodes 40A-40C. Each of vnodes 40 is a data structure that is an in-memory representation of a file stored by disk 48. Each of vnodes 40 contains a reference (e.g., a pointer) to the one of mount list entries 43 associated with the file system to which the vnode belongs.

Vnode 40B represents KERNEL.iso 50. To mount KERNEL file system 47, kernel 25 creates a virtual device for KERNEL.iso 50. In some embodiments, the virtual device is generated as an instance of a device driver, e.g., the and device driver. The device driver creates a vnode device and associates the vnode device with vnode 40B, which represents KERNEL.iso 50. The association may comprise a reference (e.g., a pointer) from the device to the vnode or vice-versa. In some instances, the vnode is redefined as a special device file. Kernel 25 then mounts the virtual device (associated with vnode 40B) to root file system 46. Each of mount list entries 43 specifies the device used to interact with the associated file system for the entry.

In accordance with the techniques of this disclosure, mount list entries 43 each comprise a respective one of verified flags 33A-33B. Each of verified flags 33 is a binary value that allows the file system described by the respective one of mount list entries 43 to be marked as verified. In addition, vnodes 40A-40C each comprise a respective one of verified flags 41A-41C. Verified flags 41 indicate whether the file associated with the respective one of vnodes 40 has been verified.

After kernel 25 mounts KERNEL file system 47, kernel 25 passes a file descriptor for KERNEL.iso 50 to veriexec 26 and directs veriexec 26 to verify the integrity of KERNEL.iso 50. Veriexec 26 reads KERNEL.iso 50, KERNEL_ISO.sig 52, and KERNEL_ISO.certs 54 from root file system 46 and verifies that the digital signature comprised by KERNEL_ISO.sig 52 for KERNEL.iso 50 is valid by first establishing a chain of trust using the certificate chain in KERNEL_ISO.certs 54. Veriexec 26 then computes a digital fingerprint for KERNEL.iso 50 using the same hash algorithm used to generate KERNEL_ISO.sig 52 and decrypts KERNEL_ISO.sig 52 using the public key from the signing one of the certificates in KERNEL_ISO.certs 54. Finally, veriexec 26 compares the result of decrypted KERNEL_ISO.sig 52 with the computed digital fingerprint. KERNEL.iso 50 is corrupt when the values fail to match, and in such instances veriexec 26 returns a fail or warning value to kernel 25. If the values match, however, the integrity of KERNEL.iso 50 is verified.

Upon verifying KERNEL.iso 50, veriexec 26 invokes file system mark 31 (illustrated as "FS mark 31"), a system call that implements techniques of this disclosure. File system mark 31 receives, from veriexec 26, the file descriptor for KERNEL.iso 50 as a parameter and directs kernel 25 to mark, as verified, the file system that is backed by the file associated with the file descriptor.

To mark the file system, kernel 25 obtains, from virtual file system 32, vnode 40B that represents KERNEL.iso 50 using the file descriptor. Kernel 25 then sets verified flag 41B to mark vnode 40B as representing a file (KERNEL.iso 50) that has been previously verified by veriexec 26. Vnode 40B is valid so long as KERNEL.iso 50 is mounted as a file system.

Vnode 40B does not include a reference (e.g., a pointer) to the file system for which the file that vnode 40B represents is a backing store (i.e, KERNEL file system 47). As a result, neither virtual file system 32 nor kernel 25 comprises a data structure that provides a comprehensive view of the relationship between vnodes 40 and mount list entries 43. Kernel 25, in order to mark the file system, therefore queries each of mount list entries 43 to obtain the mounted device for file system corresponding to the entry. For each mount list entry, if the mounted device for the mount list entry is backed by a file represented by one of vnodes 40 that is marked as verified (according to the one of verified flags 41 for the vnode), then kernel 25 sets the appropriate one of verified flags 33 for the file system. In the example of FIG. 2, kernel 25 determines that KERNEL file system 47 corresponding to mount list entry 43B is mounted as the vnode device associated with vnode 40B, where vnode 40B refers to KERNEL.iso 50. That is, KERNEL.iso 50 is the backing store for KERNEL file system 47. Because verified flag 41B of vnode 40B is set, kernel 25 sets verified flag 33B to indicate that KERNEL file system 47 is a verified file system.

In some embodiments, kernel 25 queries the device drivers for each of mount list entries 43 to obtain the one of vnodes 40 (that is, the device vnode) for the file system corresponding to the mount list entry. In addition, kernel 25 may limit, in some instances, filter queries to device drivers based on certain criteria. For instance, kernel 25 may only query devices cloned from the and device driver. As another example, kernel 25 may only query a device for one of mount list entries 43 when the mount list entry indicates that the corresponding file system is read-only, for a writable file system is subject to future corruption. In some embodiments, kernel 25 only marks, as verified, file systems that are backed by an ISO image.

KERNEL file system 47 comprises file 45, which may be an executable binary, a shared library, a configuration file, or another type of file that requires integrity verification. KERNEL file system 47 having been verified according to the techniques of this disclosure, veriexec 26 directs image verify 34 to verify file 45 by leveraging this file system status. Specifically, image verify 34 first obtains the vnode 40C that represents file 45 from virtual file system 32. Because each of vnodes 40 includes a reference (e.g., a pointer) to the one of mount list entries 43 for the file system to which the vnode belongs, vnode 40C includes a reference to mount list entry 43B, which corresponds to KERNEL file system 47. Image verify 34 resolves the reference from vnode 40C to mount list entry 43B and determines that verified flag 33B is set. KERNEL file system 47 is therefore marked as a verified file system, which indicates that files contained therein, including file 45, are likewise not corrupt. Image verify 34 returns an indication of the verification status of file 45 to veriexec 26.

By verifying file 45 in this manner, veriexec 26 may avoid calculating a fingerprint for file 45 and may thus achieve time and resource advantages over conventional verification techniques.

Figure 3:
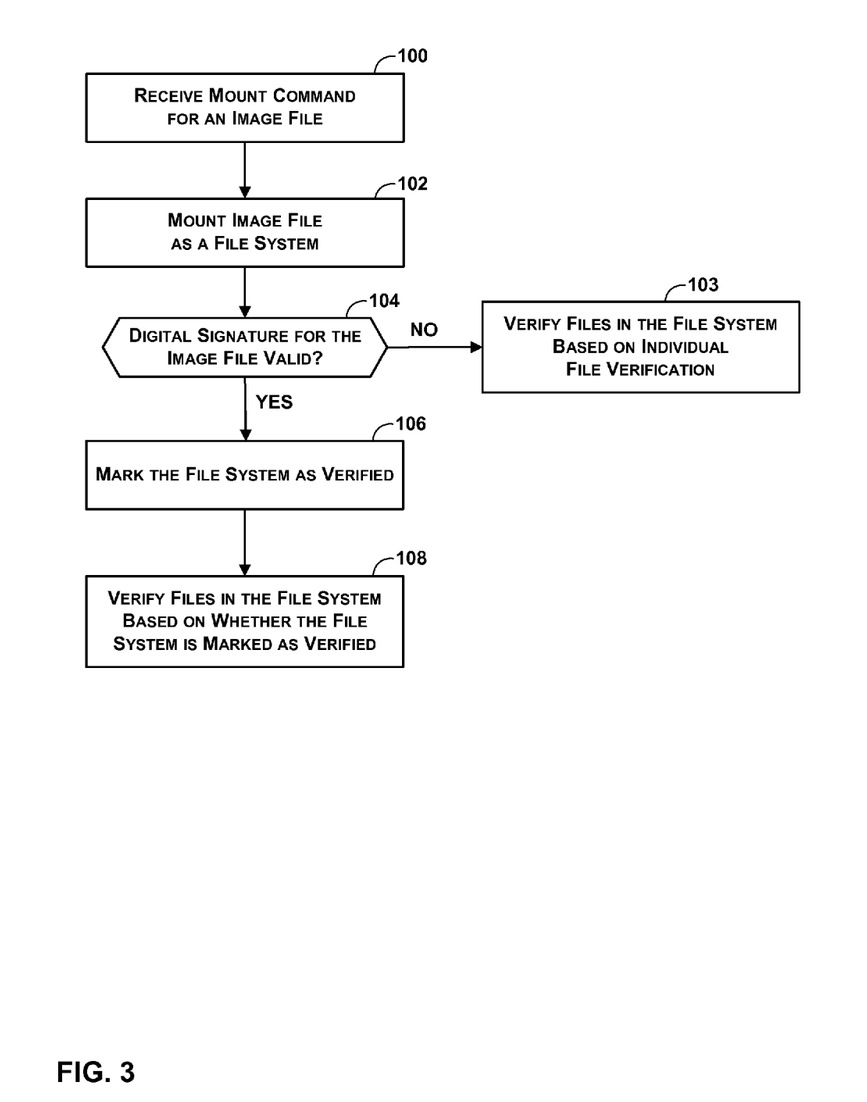
FIG. 3 is a flowchart illustrating an example mode of operation for a network device operating in accordance with the techniques described.

FIG. 3 is a flow chart illustrating an example mode of operation for verifying the integrity of files in accordance with the techniques described. For purposes of explanation, the mode of operation is described with respect to components of routing engine 12 of router 10.

Initially, kernel 25 receives a command to mount a device that supports a file system backed by an image file (100). Such a command may be issued by an administrator, may be part of a boot sequence of the device, or may be issued by one of daemons 22. Kernel 25 mounts the file system to a mount point in virtual file system 32 (102). Constituent files of the file system are now accessible and may be individually loaded and executed. After mounting the file system, kernel 25 verifies the integrity of the image file backing the file system to be mounted by directing veriexec 26 to compute a digital signature for the image file and to verify that the digital signature matches a pre-computed digital signature associated with and provided with the image file (104). If the digital signatures fail to match (NO branch of 104), the image file used to back the file system to be mounted is corrupt and veriexec 26 does not mark the file system as verified. As a result, future requests to execute files in the file system cause veriexec 26 to individually verify such files (103).

When the digital signatures match (YES branch of 104), however, the integrity of the image file is confirmed. Because the image file backing the newly mounted file system has been verified by veriexec 26 as a whole, kernel 25 sets an additional flag to mark the file system as verified (106). As kernel 25 reads and executes files stored by disk 48, veriexec 26 verifies that certain of the files are not corrupt by first determining whether the files are stored on a verified file system (108). That is, if an individual file to be loaded and executed is accessible through a file system mounted from a corresponding image file that has been verified at the time of mounting, then veriexec 26 bypasses verification of the individual file and operating system 24 proceeds directly to loading and execution of the file. However, if the file to be loaded and executed is associated with a file system for which the corresponding image file was not verified, then veriexec 26 commences verification of the individual file before the file can be loaded and executed. In some instances, the individual file to be verified are to be loaded and executed as an aspect of a boot process of the device.

Figure 4A:
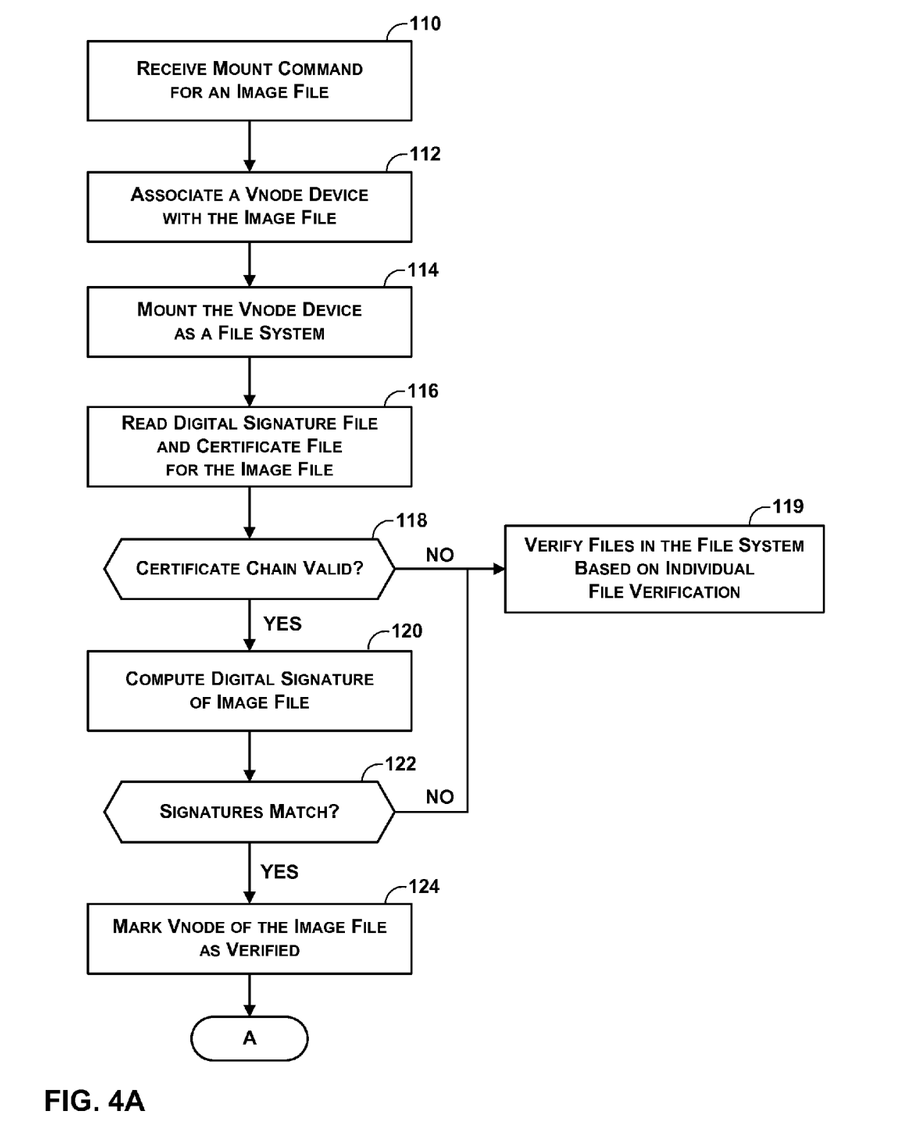
FIGS. 4A-4B depict a flowchart illustrating an example mode of operation for a network device that verifies and marks a file system according to the techniques described herein.
Figure 4B:
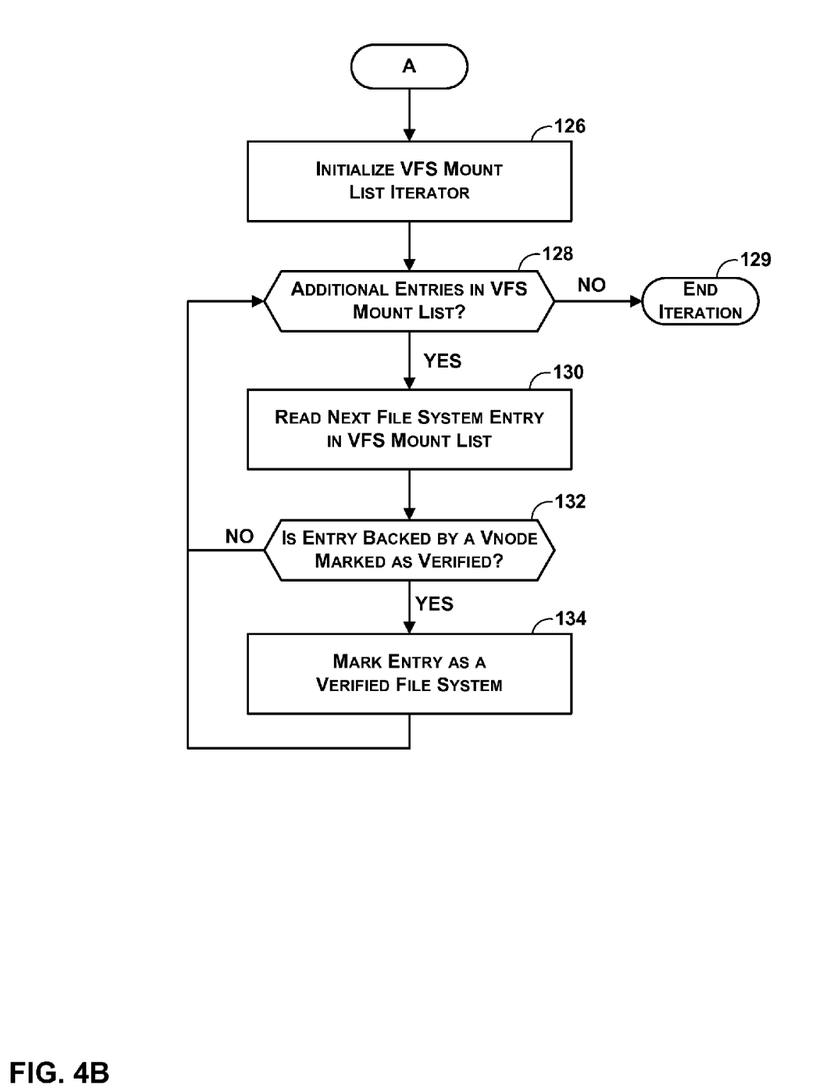

FIGS. 4A-4B depict a flowchart illustrating an example mode of operation for marking a file system as verified in accordance with the techniques herein described. For purposes of explanation, the mode of operation is described with respect to components of routing engine 12 of router 10.

Kernel 25 receives a command to mount a device that supports a file system backed by an image file (110). To mount the file system, kernel 25 first creates a vnode device and associates the device with the vnode that represents the image file (112), then mounts the vnode device to virtual file system 32 (114). Virtual file system 32 creates a mount list entry for the vnode device as part of the mount process to enable the vnode device and, as a result, the image file to be used as a file system.

Upon mounting the file system, kernel 25 directs veriexec 26 to verify the integrity of the image file that back the file system. Veriexec 26 reads a signature file and a certificate file associated with the image file (116). These files contain, respectively, a signature of the image file and a series of certificates, including the certificate of the signer. Starting at the certificate of the signer, veriexec 26 attempts to establish a chain of trust for the certificates (118). If veriexec 26 determines that not all certificates in the chain are trustworthy (NO branch of 118), future requests to kernel 25 to execute a file in the file system cause veriexec 26 to individually verify the file (119). If, however, the certificate chain is valid (YES branch of 118), veriexec 26 reads the image file and first runs a hash algorithm to generate a digital fingerprint, then computes a digital signature from the fingerprint using the public key of the signing certificate (120). Veriexec 26 compares the computed digital signature to the digital signature contained in the signature file. If the signatures fail to match (NO branch of 122), veriexec 26 individually verifies the files in the file system (119).

If the signatures match (YES branch of 122), the image file is verified and veriexec 26 notifies kernel 25. Kernel 25 then marks the vnode that represents the image file as verified by setting a verified flag (e.g., a Boolean value of the vnode data structure) (124).

Kernel 25 iterates through the mount list of virtual file system 32 to find and mark the newly mounted file system as verified. First, kernel 25 initializes an iterator that allows the kernel to traverse the virtual file system 32 mount list (126). If there are no additional entries in the mount list according to the iterator (NO branch of 128), kernel 25 stops iterating (129). Otherwise, kernel 25 reads the next file system entry in the virtual file system 32 mount list, as specified by the iterator (130). Kernel 25 then obtains the device for the file system and determines whether the device for the file system is associated with a vnode that is marked as verified (132). If so (YES branch of 132), kernel 25 marks the file system as verified by setting a verified flag in the virtual file system 32 mount list entry for that file system (134). Kernel 25 then proceeds to the next mount list entry in virtual file system 32, if any (128).

Figure 5:
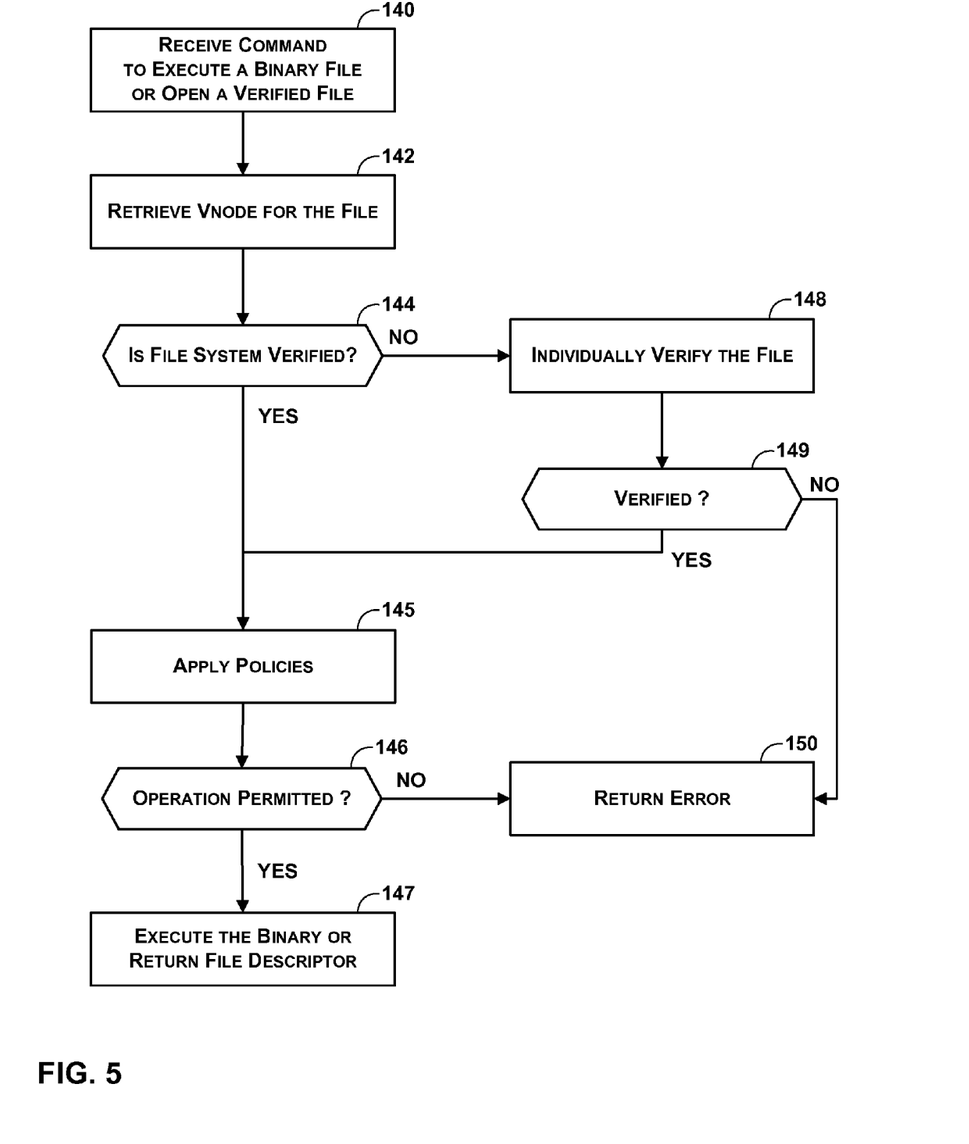
FIG. 5 is a flow chart illustrating an example mode of operation for a network device that verifies individual files in accordance with the techniques described.

FIG. 5 is a flow chart illustrating an example mode of operation for verifying a file using a verified file system according to the described techniques. In this example mode, kernel 25 receives a command from one of daemons 22 to execute a binary file or to open a verified file (140). Opening a verified file, which may be specified, for example, in the received open command by a flag, directs kernel 25 to cause the open command to fail if the file has been modified. Kernel 25 directs veriexec 26 to verify the file. Image verify 34 of veriexec 26 obtains the vnode that represents the file from virtual file system 32 (142) and resolves the file system pointer in the vnode structure to determine the virtual file system 32 mount list entry for the file system that comprises the vnode. If the file system is not verified according to the mount list entry (NO branch of 144), image verify 34 indicates this to veriexec 26, which may then apply conventional verification techniques to the file on an individual basis (148). If veriexec 26 fails to verify the file (NO branch of 149), veriexec 26 directs kernel 25 to return an error in response to the received command (150).

If, however, the mount list entry is marked as verified (YES branch of 144), the file system that contains the file is not corrupt, which indicates that the file is not corrupt. Likewise, if veriexec 26 individually verifies the file (YES branch of 149), then the file is not corrupt. Kernel 25, assured of an uncorrupted file, may perform other checks prior to executing the binary file or returning a file descriptor. In the exemplary mode of operation illustrated in FIG. 5, kernel 25 applies policies to determine whether the requested operation is valid for the file given the context (145). For example, kernel 25 may evaluate the file attributes. These attributes may be stored in the image file as flags associated with the binary file. For example, kernel 25 may check whether the file may be executed with a debugger, whether the file has adequate permissions, resource limits that may apply, whether the file is an aspect of third-party developed software, or other attributes. If the file attributes indicate that the requested operation is valid for this file given the context (YES branch of 146), kernel 25 performs the operation. That is, kernel 25 executes the binary or returns a file descriptor for the open command (147). If the operation is not permissible (NO branch of 146), kernel 25 returns an error in response to the received command.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A device comprising:
   a processor;
   a computer-readable storage medium that stores a file system as an image file, wherein the image file is stored on the computer-readable storage medium as a single file that comprises a plurality of files and metadata for the file system;
a virtual file system comprising a mount list entry that corresponds to the file system,
wherein the file system is mounted on the virtual file system,
wherein the mount list entry comprises a first verified flag that indicates whether the file system has been verified,
wherein the virtual file system comprises a data structure that is an in-memory representation of the image file, and
wherein the mount list entry specifies the data structure as representing the image file that is used as a backing store for the file system;
a verified execution module executing on the processor to determine whether the image file is corrupt when the file system is mounted;
a kernel module executing on the processor to set the first verified flag when the verified execution module determines that the image file is not corrupt, wherein the kernel module obtains the data structure from the virtual file system using the mount list entry and sets the first verified flag when the data structure indicates the image file is not corrupt; and
an image verify module executing on the processor to verify a file in the plurality of files when an access request is received for the file, wherein the image verify module bypasses individual verification of the file by individually verifying the file only when the first verified flag is not set.

2. The device of claim 1,
wherein the computer-readable storage medium stores a first digital signature associated with the image file,
wherein the verified execution module calculates a hash of the image file to generate a second digital signature and compares the first digital signature to the second digital signature, and
wherein the kernel module sets the first verified flag only when the verified execution module determines that the first digital signature matches the second digital signature.

3. The device of claim 2, wherein the verified execution module calculates the first digital signature of the image file using a public key of a digital certificate.

4. The device of claim 1,
wherein the data structure comprises a second verified flag,
wherein the kernel module sets the second verified flag when the image file is not corrupt, and
wherein the kernel module sets the first verified flag when the data structure indicates the image file is not corrupt by obtaining the data structure from the virtual file system using the mount list entry and setting the first verified flag when the second verified flag is set.

5. The device of claim 1, wherein the data structure comprises a vnode.

6. The device of claim 4, wherein the kernel associates the data structure with a device and mounts the device to mount the file system on the virtual file system, wherein the device is an instance of a device driver.

7. The device of claim 6,
wherein the mount list entry specifies the device,
wherein the data structure does not include a reference to the mount list entry in the virtual file system, and
wherein the kernel module determines the device for the file system based at least on the mount list entry, wherein the mount list entry specifies the device, and obtains the data structure from the device.

8. The device of claim 1, further comprising an image verify module that receives a file structure associated with a file in the file system and verifies the integrity of the file by determining whether the file system is verified.

9. The device of claim 8, wherein the image verify module marks the file as verified when the first verified flag is set.

10. The device of claim 1, wherein the image file is an International Organization for Standardization (ISO) 9660 image.

11. The device of claim 1, wherein the file is an executable binary for which an access request is received as part of a boot process of the device.

12. A method comprising:
reading an image file from a computer-readable storage medium of a network device that stores a file system as the image file, wherein the image file is stored on the computer-readable storage medium as a single file that comprises files and metadata for the file system;
mounting the file system to a virtual file system by creating a mount list entry that corresponds to the file system,
wherein the mount list entry comprises a first verified flag that indicates whether the file system has been verified,
wherein the virtual file system comprises a data structure that is an in-memory representation of the image file, and
wherein the mount list entry specifies the data structure as representing the image file that is used as a backing store for the file system;
determining whether the image file is corrupt when the file system is mounted;
after determining whether the image file is corrupt, setting the first verified flag when the image file is not corrupt by obtaining the data structure from the virtual file system using the mount list entry and setting the first verified flag when the data structure indicates the image file is not corrupt;
receiving an access request for a file in the file system of the image file; and
bypassing individual verification of the file by individually verifying the file only when the first verified flag is not set.

13. The method of claim 12, further comprising:
reading a first digital signature associated with the image file from the computer-readable storage medium;
calculating a hash of the image file to generate a second digital signature;
comparing the first digital signature to the second digital signature; and
after comparing the first digital signature to the second digital signature, setting the first verified flag only when first digital signature matches the second digital signature.

14. The method of claim 13, further comprising calculating the first digital signature of the image file using a public key of a digital certificate.

15. The method of claim 12, wherein the data structure comprises a second verified flag, the method further comprising:
setting the second verified flag when the image file is not corrupt,
wherein setting the first verified flag when the data structure indicates the image file is not corrupt comprises obtaining the data structure from the virtual file system using the mount list entry and setting the first verified flag when the second verified flag is set.

16. The method of claim 12, wherein the data structure comprises a vnode.

17. The method of claim 15, further comprising:
instantiating a device driver as a device; and
associating the data structure with the device;
mounting the device to mount the file system on the virtual file system, wherein the data structure does not include a reference to the mount list entry in the virtual file system;
determining the device for the file system based at least on the mount list entry, wherein the mount list entry specifies the device; and
obtaining the data structure from the device.

18. A non-transitory computer-readable medium comprising instructions for causing a programmable processor to:
read an image file from a computer-readable storage medium of network device that stores a file system as an image file, wherein the image file is stored on the computer-readable storage medium as a single file that comprises files and metadata for the file system;
mount the file system to a virtual file system by creating a mount list entry that corresponds to the file system, wherein the mount list entry comprises a first verified flag that indicates whether the file system has been verified;
determine whether the image file is corrupt when the file system is mounted;
after determining whether the image file is corrupt, set the first verified flag when the image file is not corrupt by obtaining the data structure from the virtual file system using the mount list entry and setting the first verified flag when the data structure indicates the image file is not corrupt;
receiving an access request for a file in the file system of the image file; and
bypass individual verification of the file by individually verifying the file only when the first verified flag is not set.

19. The non-transitory computer-readable medium of claim 18,
wherein the data structure comprises a second verified flag, and
wherein the instructions further cause the processor to set the second verified flag when the image file is not corrupt,
wherein setting the first verified flag when the data structure indicates the image file is not corrupt comprises obtaining the data structure from the virtual file system using the mount list entry and setting the first verified flag when the second verified flag is set.

* * * * *